Sept. 29, 1959 C. McMANIS 2,906,144
MEANS FOR DRILLING SMALL BORES
Filed June 18, 1957
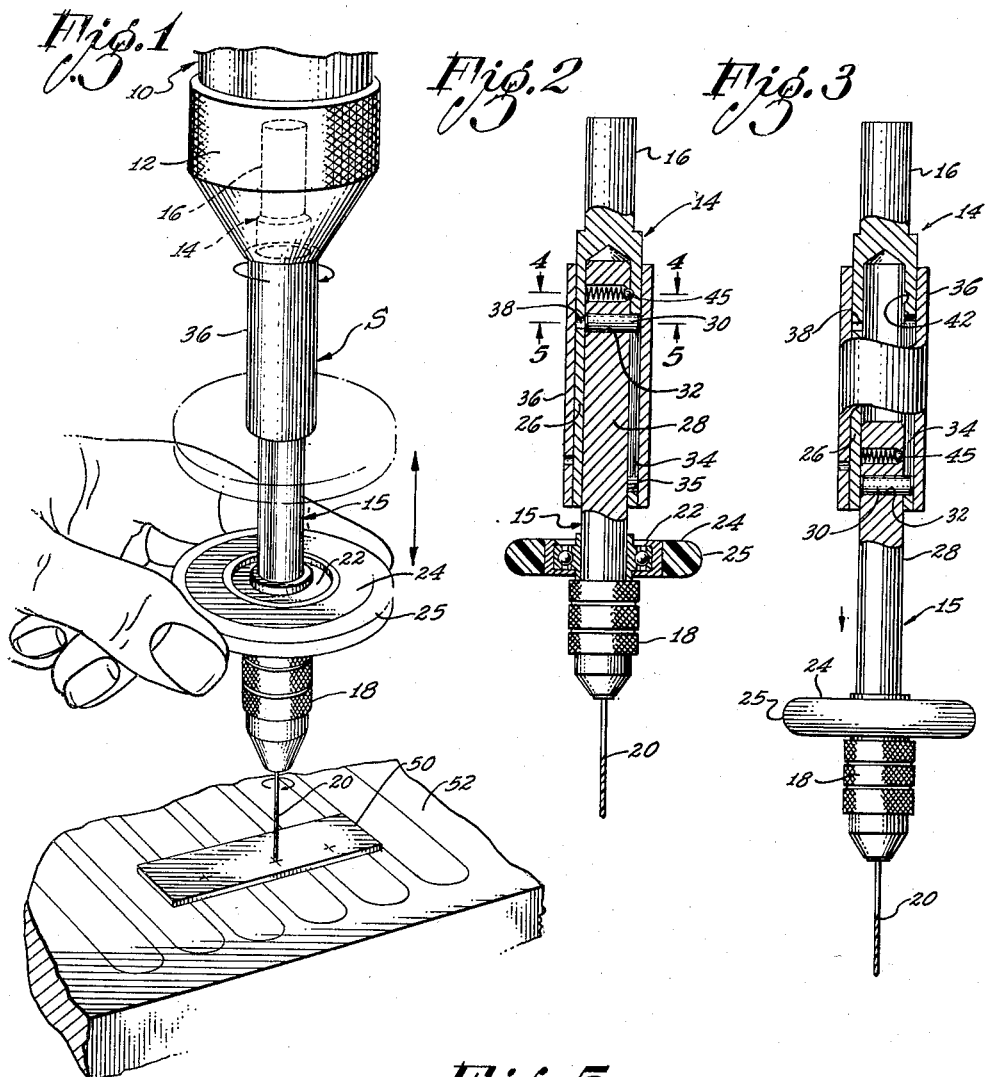
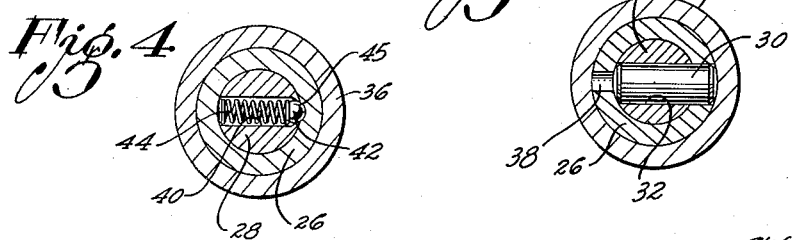
INVENTOR:
Clifford McManis
By Smyth & Roston
Attorneys United States Patent Office 2,906,144
Patented Sept. 29, 1959

2,906,144

MEANS FOR DRILLING SMALL BORES

Clifford McManis, Hawthorne, Calif.

Application June 18, 1957, Serial No. 666,367

2 Claims. (Cl. 77—32)

This invention relates to a power actuated drilling device, and more particularly relates to a device for precision drilling of small diameter bores.

A conventional drill press adapted for a wide range of drill sizes is well suited for drilling operations with drills of average and larger diameter which operate with an optimum feed thrust of relatively high magnitude. If such a relatively large drill is dull, or is out of round, or encounters undue chip interference, the erratic behavior of the drill reacts vigorously on the whole drill head and thus immediately brings the difficulty to the operator's attention for prompt correction.

For a number of reasons, however, a conventional drill press is not sensitive to the erratic behavior of a drill of exceptionally small diameter. One reason, of course, is that a drill of small diameter must be advanced into the work piece with a feed pressure of correspondingly small magnitude and therefore only exceedingly light reaction forces are engendered by erratic drill behavior. The relatively massive parts of the drill press mechanism that cooperate to apply the feed pressure have too much inertia to respond to these light forces in any readily noticeable manner.

Another reason for the erratic behavior escaping the notice of the operator is that a drill of very small diameter is inherently flexible and is capable of absorbing small reaction forces by resilient flexure instead of transmitting the reaction forces to the drill feed mechanism. A further factor to be given consideration is that the manually operable mechanism of a conventional drill press for advancing the drill spindle operates with a high leverage advantage so that a relatively light force applied manually by the operator creates a feed thrust of much greater magnitude. Because of this advantageous leverage it is only too easy for the operator to apply so much pressure as to break a small drill. More often then not, therefore, an operator has too much fear of breaking drills and becomes over cautious with consequent unnecessary prolongation of small bore drilling operations.

It is also important to note that the leverage advantage of the manual feed mechanism works in reverse with respect to the transmission of reaction forces from the drill back through the mechanism. Thus, the magnitude of the transmitted reaction force is reduced in inverse proportion to the leverage ratio and becomes too small to be readily noticed by the time it reaches the operator's hand.

A still further reason for a small reaction force escaping the notice of the operator is found in the manner in which the drill feed mechanism is manipulated by the operator. Usually a full hand grip is utilized with no intent whatsoever to detect any erratic reaction force by touch.

The present invention eliminates these unfavorable factors in drilling small diameter bores and does so by employing a simple, small scale, light-weight, extensible drill spindle for advancing a small diameter drill solely by finger pressure. In the preferred practice of the invention the drill spindle comprises two slidingly telescoped spindle members keyed together for rotation in unison with the lowermost spindle member provided with a suitable finger piece for applying the feed pressure. The finger piece may be mounted on the extensible spindle by a ball bearing and may have the general configuration of a wheel formed with a rounded rim surface for gripping by the fingers. The operator simply holds this finger piece against rotation and advances the drill by relatively light finger pressure.

Small reaction forces are readily detected by the operator for a number of reasons. In the first place, the low inertia of the movable spindle member makes the finger piece highly responsive to any of the relatively light reaction forces that may be caused by erratic drill behavior. In the second place, the finger tips of an operator are exceedingly sensitive, being many times more sensitive than the rest of the hand. In the third place, the placing of the finger piece at a low level close to the drill is conducive to ready detection of erratic drill behavior. The hand naturally assumes an alert position instead of merely hanging or resting on the control means as would occur at a higher level and, moreover, the low level finger piece is under observation simultaneously with the drill itself.

With the finger piece grasped between the index finger and the thumb, the operator quickly develops a highly sensitive touch for the particular small diameter drill that is being used. If the drill is dull, or if the drill is out of round, or if a chip hang-up occurs, the effect is immediately telegraphed to the operator's fingers in a highly noticeable and unmistakable manner. Drill breakage is greatly reduced and fear of small bore drilling is removed.

The various features and advantages of the invention will be apparent from the following detailed description considered with the accompanying drawing.

In the drawing, which is to be regarded as merely illustrative:

Figure 1 is a perspective view of the presently preferred embodiment of the invention in the course of a drilling operation;

Figure 2 is a view partly in section and partly in side elevation showing the extensible drill spindle of the invention in retracted position;

Figure 3 is a similar view showing the extensible spindle in an extended position;

Figure 4 is a transverse section taken as indicated by the line 4—4 of Figure 2, showing the construction of a detent means for holding the extensible drill spindle in its retracted position; and Figure 5 is a transverse section along the line 5—5 of Figure 2 showing the manner in which the two spindle members are keyed together for simultaneous rotation.

Figure 1 shows the spindle 10 of a conventional drill press with the usual chuck 12 to hold drills of various sizes. The particular embodiment of the present invention shown in Figure 1, comprises what may be termed an auxiliary spindle, generally designated S, for engagement by the chuck 12. Thus, the illustrated embodiment of the invention is an accessory for use in a conventional drill press. It will be apparent, however, that the invention may be incorporated in the construction of a drill press proper instead of being a separate accessory.

The auxiliary spindle S comprises an upper spindle member 14 and a lower spindle member 15, these two members being in slidingly telescoped relation to make the auxiliary spindle longitudinally extensible and contractable. The upper spindle member 14 is formed with a shank 16 at its upper end for engagement by the drill press chuck 12, and the lower spindle member 15 has a drill chuck 18 of conventional construction to hold a small diameter drill 20.

Mounted on the lower spindle member 15 by a suitable ball bearing 22 is a concentric circular finger piece 24 that may be readily grasped between the thumb and the forefinger in the manner shown in Figure 1. Preferably, the finger piece 24 is a collar of the character of a wheel formed of suitable plastic material and shaped with a rounded rim or peripheral surface 25. The ball bearing 22 holds the finger piece 24 against axial movement relative to the lower spindle member 15 and permits the finger piece to be held against rotation when the auxiliary spindle S rotates in the course of boring a hole.

The two spindle members 14 and 15 may be slidingly keyed together in any suitable manner for rotation in unison and for extension and retraction of the lower member relative to the upper member. In the construction shown in the drawing, for example, the upper spindle member 14 has a tubular lower end portion 26 and the lower spindle member 15 has an upper end portion 28 of cylindrical configuration that telescopes into the tubular end portion in a sliding manner.

Key means in the form of a transverse pin 30 is mounted in a diametrical bore 32 of the cylindrical end portion 28 and extends into a longitudinal slot 34 in the tubular end portion 26 to prevent relative rotation of the two spindle members. The cross pin 30 cooperates with the lower end 35 of the slot 34 to limit the extension of the lower spindle member 15 relative to the upper spindle member 14.

To retain the cross pin 30 in the bore 32, a sleeve 36 slidingly encases the tubular end portion 26 of the upper spindle member 14. This sleeve is retractable upward to expose the slot 34 to permit the pin 30 to be installed. The sleeve 36 is normally frictionally retained at the lower position shown in the drawing and for this purpose the tubular end portion 26 of the upper spindle member may be slightly tapered with its maximum diameter at its lower end, the maximum diameter being sufficient for effective frictional engagement with the sleeve.

Preferably, the tubular portion 26 of the upper spindle member 14 has a radial bore 38 diametrically opposite from the slot 34 to permit the pin 30 to be pushed out of the bore 32. Thus, with the sleeve 36 elevated above the radial bore 38, a suitable tool may be inserted through the radial bore to force the pin 30 outward through the longitudinal slot 34.

In the preferred practice of the invention, suitable detent means is provided to releasably hold the auxiliary spindle S in its retracted position. In the construction shown in the drawing, a diametrical bore 40 is provided in the cylindrical end portion 28 of the lower spindle member 15 to register with a recess 42 (Figures 3 and 4) in the tubular end portion 26 of the upper spindle member 14 when the lower spindle member is in its upper retracted position. A suitable coil spring 44 in the diametrical bore 40 urges a detent ball 45 radially outward for releasable engagement with the recess 42.

Preferably, the diametrical bore 40 is on the same diameter as the longitudinal slot 34 and the end of the diametrical bore 40 is slightly restricted to prevent the detent ball from being displaced completely out of the diametrical bore. Thus, when the lower spindle member 15 is moved longitudinally downward from its retracted position shown in Figure 2, the detent ball 45 extends into the longitudinal slot 34 and therefore does not create frictional resistance to longitudinal movement of the lower spindle member 15 throughout the major lower portion of its range of extension.

The manner in which the invention serves its purpose may be readily understood from the foregoing description. It is a simple matter to engage the chuck 12 of the drill with the shank portion 16 of the auxiliary spindle S so that the auxiliary spindle may serve in effect as an extension of the drill press spindle 10. With a drill 20 in the chuck 18 of the auxiliary spindle, a work piece 50 may be placed on the magnetic bed 52 of the drill press in a desired position for the drilling of a small diameter bore. The operator then starts the drill press and grasps the finger piece 24 in the manner shown in Figure 1 to feed the drill 20 by finger pressure. As heretofore explained, the operator soon develops a "touch" for the particular drilling operation and readily senses erratic behavior on the part of the drill 20.

The detent ball 45 cooperates with the detent recess 42 to releasably hold the lower spindle member 15 in its upper retracted position whenever desired. The detent ball 45 engages the recess 42 automatically whenever the lower spindle member 15 is moved to its upper limit position.

The description in specific detail of the selected embodiment of the invention will suggest various changes, substitutions and other departures from our disclosure within the spirit and scope of the appended claims.

I claim:

1. An extensible and contractable accessory assembly for using small drills in a drill press, comprising: a first elongated spindle member; a second elongated spindle member, one of said two spindle members having a hollow inner end portion, said hollow end portion having a longitudinal slot therein and a detent recess spaced from the slot, the other of the two spindle members having an inner end portion slidingly telescoped into said hollow inner end portion whereby the two members form an extensive and contractable drill spindle; key means on said other of the two spindle members slidable along said slot to prevent relative rotation between the two spindle members; a drill chuck on the outer end of said first spindle member to hold a drill for drilling small diameter bores; a collar rotatably mounted on said first spindle member to serve as a finger piece for controlling the extension of the drill spindle; and spring-pressed detent means in the inner end of said other spindle member for yielding engagement with said detent recess to yieldingly hold said drill spindle in contracted state, said slot being in longitudinal alignment with said detent recess to receive said detent means when the drill spindle is partially extended from said contracted state thereby to reduce the frictional resistance of the detent means against continued extension of the drill spindle.

2. An accessory assembly as set forth in claim 1 in which said key means comprises an elongated key member mounted in a transverse bore in said other of the two spindle members; and which includes a sleeve surrounding the slotted portion of said one spindle member to confine said key member.

References Cited in the file of this patent

UNITED STATES PATENTS

| | | |
|---|---|---|
| 918,062 | King | Apr. 13, 1909 |
| 1,214,754 | Carscadden | Feb. 6, 1917 |
| 1,311,039 | Burman | July 22, 1919 |
| 2,076,767 | French | Apr. 13, 1937 |
| 2,387,128 | Doehring | Oct. 16, 1945 |
| 2,465,832 | Banker | Mar. 29, 1949 |

FOREIGN PATENTS

| | | |
|---|---|---|
| 250,957 | Switzerland | July 16, 1948 |